United States Patent [19]

Itoh et al.

[11] Patent Number: 4,977,200
[45] Date of Patent: Dec. 11, 1990

[54] ETHYLENE-PROPYLENE ORGANOPOLYSILOXANE RUBBER COMPOSITION

[75] Inventors: Kunio Itoh; Takeshi Fukuda; Tsutomu Nakamura, all of Gunma, Japan

[73] Assignee: Shin-Etsu Chemical Co., Ltd., Tokyo, Japan

[21] Appl. No.: 330,576

[22] Filed: Mar. 30, 1989

[30] Foreign Application Priority Data

Mar. 31, 1988 [JP] Japan ................... 63-78396

[51] Int. Cl.$^5$ ..................... C08K 13/04; C08L 23/16; C08L 83/07
[52] U.S. Cl. ..................... 523/223; 524/506
[58] Field of Search ................ 524/506; 523/223

[56] References Cited

U.S. PATENT DOCUMENTS 4,341,675  7/1982  Nakamura ................ 524/506
4,376,184  3/1983  Itoh ................ 524/506
4,761,452  8/1988  Itoh ................ 524/506

Primary Examiner—C. Warren Ivy
Attorney, Agent, or Firm—Millen, White & Zelano

[57] ABSTRACT

A rubber composition, which forms a vulcanizate having excellent surface properties such as pleasant feeling of touch and slipperiness or lubricity, comprises, in addition to conventional ingredients such as an ethylene-propylene copolymer, organopolysiloxane, reinforcing silica filler, process oil and curing agent, a powder of spherical particles, such as a poly(methyl silsesquioxane) powder, in the form having a particle diameter of 0.1 $\mu$m to 50 $\mu$m in a limited amount. The rubber composition forms a spongy rubber vulcanizate when vulcanized in the presence of a blowing agent which, by virtue of excellent surface properties, is useful as powder puffs for make-up.

15 Claims, No Drawings

ETHYLENE-PROPYLENE ORGANOPOLYSILOXANE RUBBER COMPOSITION

BACKGROUND OF THE INVENTION

The present invention relates to a rubber composition, more particularly, to a rubber composition capable of giving a vulcanizate having excellent heat resistance, recoverability from compression, electric insulation, weatherability and surface lubricity.

The rubber compositions of this invention are compounded with a mixture of an ethylene-propylene copolymer and an organopolysiloxane as the base rubber and are suitable for use as automobile parts such as plug caps, plug boots, insulation of ignition cords, weather strips and the like as well as for the production of foamed celular or spongy rubber articles suitable as automobile parts such as sponge gaskets, weather strips, sponge hoses of protectors and the like and powder puffs for makeup when vulcanized with blowing using a blowing agent.

Rubber compositions compounded with an ethylene-propylene copolymer and an organopolysiloxane in general are capable of giving a rubber vulcanizate having excellent heat resistance, low permanent compression set and high electric insulation and they are widely used to produce a variety of automobile parts including injection-molded articles such as plug caps, plug boots and the like and extrusion-molded articles such as insulation of ignition cords and the like. A defect in the rubber vulcanizates of these rubber compositions is poor surface slipperiness so that, for example, extrusion-molded articles such as weather strips and the like have poor surface lubricity which does not to ensure smooth sliding on glass surfaces.

SUMMARY OF THE INVENTION

The rubber composition of the present invention, which has been developed with an object to solve the above described problems in the prior art, comprises, in admixture:

(a) 100 parts by weight of a rubber blend composed of
(a-1) from 50 to 97% by weight of an ethylene-propylene copolymer, and
(a-2) from 50 to 3% by weight of an organopolysiloxane having an average degree of polymerization of at least 100 and represented by the average unit formula $$R_n SiO_{(4-n)/2}, \qquad (I)$$

in which R is a substituted or unsubstituted monovalent hydrocarbon group and the subscript n is a positive number in the range from 1.90 to 2.05, at least two of the groups denoted by R in a molecule being aliphatically unsaturated groups;
(b) from 5 to 200 parts by weight of a reinforcing silica filler having a specific surface area of at least 50 m²/g;
(c) from 5 to 100 parts by weight of a powder composed of spherical particles having a diameter in the range from 0.1 to 50 μm;
(d) up to 100 parts by weight of a process oil; and
(e) from 1 to 20 parts by weight of a curing agent.

DETAILED DESCRIPTION OF THE PREFERRED EMBODIMENTS

The base component, i.e. component (a), the inventive rubber composition is a combination of (a-1) a rubbery copolymer of ethylene and propylene and (a-2) an organopolysiloxane. Various kinds of ethylene-propylene copolymers are known and used in the rubber industry and any one of them can be used in the present invention as the component (a-1) including a so-called EPM which is a copolymer of ethylene and propylene in a weight ratio of 60:40 to 40:60 and so-called EPDM which is a ternary copolymer of ethylene, propylene and a diene compound as the third comonomer such as ethylidene norbornene, dicyclopentadiene, 1,4-hexadiene and the like as well as a mixture thereof. The ethylene-propylene copolymer as the component (a-1) is combined with the organopolysiloxane as the component (a-2) in a weight ratio in the range from 50:50 to 97:3. When the proportion of the ethylene-propylene copolymer is too small, the rubber composition cannot give a rubber vulcanizate having high mechanical strengths while, when the proportion of the ethylene-propylene copolymer is too large, the rubber vulcanizate obtained from the composition may be somewhat poor in the heat resistance and in the behavior of permanent compression set.

The organopolysiloxane employed as the component (a-2), which is added to improve the heat resistance and the compression set characteristic, is represented by the average unit formula $$R_n SiO_{(4-n)/2}, \qquad (I)$$

in which R is a monovalent hydrocarbon group exemplified by alkyl groups, e.g., methyl, ethyl, propyl and butyl groups, cycloalkyl groups, e.g., cyclohexyl group, alkenyl groups, e.g., vinyl and allyl groups, and aryl groups, e.g., phenyl and tolyl groups, as well as those substituted monovalent hydrocarbon groups obtained by replacing a part or all of the hydrogen atoms in the above named hydrocarbon groups with halogen atoms, cyano groups and the like such as chloromethyl, 3,3,3-trifluoropropyl and 2-cyanoethyl groups. It is preferable that at least 50% by moles, more preferably, at least 80% by moles of the groups denoted by R in the molecule are methyl groups. It is essential that at least two of the groups denoted by R in a molecule are aliphatically unsaturated groups such as alkenyl groups, cyclopentadienyl groups, 3-methacryloxypropyl groups and the like. The organopolysiloxane can be in an oily, resinous or gummy form without particular limitation provided that the subscript n in the average unit formula (I) is in the range from 1.90 to 2.05 and the average degree of polymerization thereof is at least 100 in order that the rubber vulcanizate obtained therefrom may have high mechanical strength.

The component (b) in the inventive rubber composition is a reinforcing silica filler which can be any of those conventionally used as a reinforcing agent of silicone rubbers. It is essential in order to fully obtain the reinforcing effect that the silica filler has a specific surface area of at least 50 m²/g or, preferably, at least 100 m²/g or, more preferably, in the range from 100 to 300 m²/g.

Reinforcing silica fillers can be classified depending on the manufacturing process into dry-process silica fillers and wet-process silica fillers. The dry-process silica filler is manufactured by the flame hydrolysis of a chlorosilane compound such as silicon tetrachloride, methyl trichlorosilane and the like in a high-temperature flame and called a fumed silica filler because of the extremely fine particle size distribution of nm order in the diameter. Dry-process silica fillers are widely used in silicone rubbers for electric insulation use because they generally have a high purity, little hygroscopicity and excellent reinforcing effect. Several commercial products of dry-process reinforcing silica fillers are known and available under the trade names of Aerosil manufactured by DEGUSSA Co., West Germany, Cab-o-sil manufactured by Cabot Inc., U.S.A., and the like. The wet-process silica fillers are manufactured by the hydrolysis of, for example, sodium silicate in an aqueous medium acidified with an acid such as hydrochloric and sulfuric acids to precipitate hydrated silica which is washed with water to remove the salt formed by neutralization and dried. Several commercial products of wet-process reinforcing silica fillers are known and available under the trade names of Carplex manufactured by Shionogi & Co., Tokusil manufactured by Tokuyama Soda Co., Nipsil manufactured by Nippon Silica Co., Ultrasil manufactured by C. P. Hall Co., Hisil manufactured by PPG Co., Santocel manufactured by Monsanto Co. and the like. The reinforcing silica filler employed as component (b) in the inventive rubber composition can be any of these dry-process and wet-process silica fillers without particular limitations.

The amount of the reinforcing silica filler employed as the component (b) in the inventive rubber composition is in the range from 5 to 200 parts by weight or, from 20 to 100 parts by weight per 100 parts by weight of component (a), i.e. combination of the components (a-1) and (a-2). When the amount of the reinforcing silica filler is too small, the desired reinforcing effect is naturally insufficient so that the mechanical strengths of the rubber vulcanizate would be poor. On the other hand, difficulties are encountered in compounding the reinforcing silica filler in an excessively large amount and the rubber composition would be poor in the workability of roll milling.

The component (c) in the inventive composition is a powder in the form of spherical particles improves the extrusion moldability of the rubber composition and imparts lubricity to the vulcanizate of the inventive rubber composition . The term "spherical particle" as used herein means that any microscopic projection on an optical or electron microphotograph of the particles has a largest diameter which is not larger than 2.0 times or, preferably, than 1.3 times of the shortest diameter. This value is referred to as the sphericity factor of the particle hereinbelow. Substantially all of the spherical particles of the powder should have a particle diameter, relative to the largest diameter in the projection on a microphotograph, in the range from 0.1 to 50 $\mu$m or, preferably, from 0.2 to 10 $\mu$m. Even disregarding the difficulty in manufacturing, powders of spherical particles having a diameter smaller than 0.1 $\mu$m have little effect in imparting the vulcanizates of the rubber composition with lubricity. When the particle diameter of the powder is too large, the mechanical strengths of the vulcanizate of the rubber composition compounded with such a powder is decreased.

Provided that the particle configuration is spherical, powders of any material can be used as component (c) in the inventive composition. For example, suitable materials of the powder include plastic resins such as fluorocarbon resins, polyester resins, nylons, polyamide resins, polypropylenes and the like. In order to impart full surface lubricity to the vulcanizates of the rubber composition, to decrease adhesion of the vulcanizate to the surface of glass, plastics and the like and to prevent icing when the deposited water thereon is frozen, however, a preferable material of the powder of spherical particles is a poly(methyl silsesquioxane) which is obtained by the hydrolysis-condensation reaction of a methyl trialkoxy silane, orthoalkyl silicate or a partial hydrolysis product thereof in an aqueous medium containing an alkaline earth hydroxide or an alkali carbonate or in an aqueous medium containing an amide or ammonium compound. It is sometimes advantageous that the powder of spherical particles is subjected to a surface treatment with a methyl silane compound, methyl polysiloxane and the like.

The amount of the powder of spherical particles in the inventive composition employed is in the range from 5 to 100 parts by weight per 100 parts by weight of component (a), i.e. combination of components (a-1) and (a-2). When the amount thereof is too small, the desired effect mentioned above cannot be obtained. When the amount thereof is too large, on the other hand, the rubber composition has increased stiffness with poor workability in roll milling and an increase in the hardness and brittleness of the vulcanizate of the composition occurs.

The component (d) employed in the inventive rubber composition is a process oil which can be any of known hydrocarbon-based oils conventionally used in ethylene-propylene copolymeric compositions with an object to improve the workability of the composition including paraffin-based, naphthene-based and aromatic ones. Several commercial process oil products are suitable for the purpose including liquid paraffins and those sold under the trade names of KP-380 manufactured by Idemitsu Kosan Co. and Lucant HC Series manufactured by Mitsui Petrochemical Co., of which Lucant HC Series products are preferred. The process oil employed as component (d) is not essential in the inventive composition and, when added, the amount thereof should not exceed 100 parts by weight per 100 parts by weight of component (a), i.e. combination of the components (a-1) and (a-2). A preferable amount of component (d) is in the range from 10 to 50 parts by weight per 100 parts by weight of the component (a).

The component (e) employed in the inventive composition is a curing agent of the ethylene-propylene copolymer and any of known ones can be used without particular limitations. Examples of suitable curing agents include sulfur, organic sulfur compounds such as zinc dibutyl dithiocarbomate, dibenzothiazyl disulfide, 2-mercapto benzothiazole, tetramethyl thiuram monosulfide, tetramethyl thiuram disulfide, di(pentamethylene) thiuram sulfide, 2-mercapto benzoimidazol and the like, and organic peroxides such as benzoyl peroxide, 2,4-dichlorobenzoyl peroxide, dicumyl peroxide, 2,5-dimethyl bis(2,5-tert-butyl peroxy) hexane, di-tert-butyl peroxide, tert-butyl perbenzoate, 1,1-di-tert-butyl-peroxy-3,3,5-trimethylcyclohexane, 1,3-bis(tert-butylperoxy isopropyl) benzene, tert-butylperoxy isopropyl carbonate and the like though not particularly limited thereto. These curing agents can be used either singly or as a combination of two kinds or more according to need. When the vulcanizate of the inventive composition is desired to be odorless as possible, the curing agent is preferably an organic peroxide because of the relatively weak odor of the decomposition products thereof as compared with curing agents of other types.

The amount of the curing agent in the inventive rubber composition is in the range from 1 to 20 parts by weight or, preferably, from 1 to 10 parts by weight per 100 parts by weight of component (a), i.e. combination of components (a-1) and (a-2). When the amount of the curing agent is too small, the rubber composition cannot be fully cured not to give a vulcanizate having excellent mechanical properties. When the amount of the curing agent is too large, on the other hand, vulcanizates of the rubber composition would have an unduly high hardness with brittleness not to be imparted with desired rubbery properties.

The rubber composition of the present invention is prepared by uniformly blending the above described components (a), (b), (c), (e) and, optionally, (d) in a suitable blending machine such as Banbury mixers, kneaders, intermixers, two-roll mills and the like. It is sometimes advantageous that the components (a), (b), (c) and, optionally, (d) are first blended to give a uniform base compound which is subjected to a heat treatment and then admixed with the component (e). It is of course optional that the rubber composition of the invention is further admixed with various kinds of known additives according to need including metal oxides such as titanium dioxide, aluminum oxide, zinc oxide, iron oxide and the like, fillers other than silica-based fillers such as carbon black, graphite powder, calcium carbonate, mica flakes, clay, talc, quartz powder, diatomaceous earth, baryta and aluminum hydroxide as well as organic fillers, antioxidants, aging retarders, flame retardants, coloring agents, mold release agents, ultraviolet absorbers, dispersing aids, higher fatty acids as a lubricant such as stearic and lauric acids, various kinds of carbon-functional silanes and wetting agents of the silica filler such as various kinds of silane compounds and low-molecular organopolysiloxanes.

The rubber composition of the present invention has good moldability so that, like other conventional synthetic rubber compositions in general, the composition can be molded into various shaped articles by the method of compression molding, transfer molding, injection molding, extrusion molding, calendering and the like. Since the base constituent of the inventive rubber composition is a combination of an ethylene-propylene copolymer and an organopolysiloxane, the inventive rubber composition gives a vulcanizate having excellent properties in respect of heat resistance, permanent compression set, electric insulation and weatherability along with high mechanical strengths by virtue of compounding of a reinforcing silica filler therein. Furthermore, vulcanizates of the inventive rubber composition with good surface lubricity as a consequence of compounding with a powder of spherical particles. Accordingly, the rubber composition of the invention is very useful for producing various kinds of rubber-made automobile parts such as plug caps, plug boots, ignition cords, weather strips, gaskets, protector hoses and the like and also as a material of rubber insulations of icing-free electric wires and cables.

The above described rubber composition of the present invention can be processed into a foamed cellular rubber article by compounding the rubber composition with a blowing agent as component (f) and heating the composition to effect simultaneous curing and foaming expansion by the decomposition of the blowing agent. The amount of the blowing agent employed is in the range from 1 to 20 parts by weight per 100 parts by weight of the component (a), i.e. a combination of components (a-1) and (a-2). It is important that the inventive rubber composition for foamed cellular rubber articles contains a process oil as the component (d) in an amount in the range from 5 to 100 parts by weight per 100 parts by weight of the component (a). When the amount of the process oil is too small, the foamed spongy rubber article prepared from the composition cannot have a fine cellular structure. When the amount of the process oil is too large, on the other hand, the workability of the rubber composition in roll milling may be somewhat poor and a retarding effect on the curing of the rubber composition occurs so that a cellular rubber article of fine pore distribution cannot be obtained. In this regard, the amount of the process oil is preferably in the range from 10 to 50 parts by weight per 100 parts by weight of the component (a).

The blowing agent compounded in the inventive rubber composition can be any of known ones including inorganic blowing agents such as sodium hydrogen carbonate, ammonium hydrogen carbonate and the like and organic blowing agents such as nitroso compounds, e.g., N,N'-dinitroso pentamethylene tetramine, N,N'dimethyl-N,N'-dinitroso terephthalamide and the like, azo compounds, e.g., azodicarbonamide, azobisisobutyronitrile and the like, sulfonyl hydrazide compounds, e.g., benzene sulfonyl hydrazide, p,p'-hydroxy bis(benzene sulfonyl hydrazide), toluene sulfonyl hydrazide and the like, p-toluene sulfonyl semicarbazide, trihydrazino triazine, zinc-amine complex compounds and the like. Particularly preferable among them are azodicarbonamide and p,p'-hydroxy bis(benzene sulfonyl hydrazide) because of the good workability low toxicity approved by FDA and the pleasant feeling of the foamed cellular rubber articles obtained therewith. The amount of the blowing agent in the inventive rubber composition is in the range from 1 to 20 parts by weight, preferably, from 3 to 10 parts by weight per 100 parts by weight of the component (a). When the amount of the blowing agent is too small, the rubber article obtained after curing does not have a cellular spongy structure. When the amount of the blowing agent exceeds exceed the above mentioned upper limit, no further expansion of the composition can be obtained and the cellular foamed rubber article may have somewhat poor feeling to the touch if not to mention the economical disadvantage. It is optional according to need that a known blowing aid such as carboxylic acids, e.g., salicylic acid, urea and the like is compounded in the rubber composition in combination with the above described blowing agent.

The rubber composition for foamed cellular rubber articles can be prepared by uniformly blending the components (a) to (e) and the blowing agent as the component (f) in a suitable blending machine. It is sometimes advantageous that a composition composed of the components other than the curing agent is first prepared and subjected to aging by a heat treatment at a temperature which does not cause decomposition of the blowing agent prior to compounding with the curing agent.

The rubber composition compounded with a blowing agent can be processed into a foamed cellular rubber article in a known method conventionally undertaken in the preparation of cellular rubber articles of an EPDM rubber composition. For example, the rubber composition is first compression-molded in a metal mold at 120° and 200° C. for 30 seconds to 30 minutes followed by an expanding cure in an oven at 150° to 200° C. to give a foamed cellular rubber article having excellent feeling to the touch. The thus obtained foamed cellular rubber body is useful as various automobile parts such as weather-stop sponge gaskets, protector sponge hoses and the like and also as puffs for makeup such as puffs for liquid foundations and puffs for creamy foundations.

The rubber composition of the present invention is described in more detail by way of the following examples, in which the term of "parts" always refers to "parts by weight" and the values of viscosity are all those obtained by the measurement at 25° C. Following are the procedures for the evaluation of the extrusion moldability and surface lubricity of which the results are shown in the examples.

EXTRUSION MOLDABILITY

Extruder machine: Labo-plastomill of 20 mm diameter manufactured by Toyo Seiki Co.
Temperature of head: 110° C.
Temperature of barrel: 75° C.
Velocity of revolution: 50 rpm

SURFACE LUBRICITY

Instrument surface-property tester Model HEIDEN-14 manufactured by Sinto Kagaku Co.
Load: 500 g in linear contact

EXAMPLE 1 AND COMPARATIVE EXAMPLE 1

A rubber composition was prepared by uniformly kneading, in a pressurizable kneader, 100 parts of a mixture composed of 70% by weight of an EPDM rubber (Esprene 567, a product by Sumitomo Chemical Co.) and 30% by weight of a diorganopolysiloxane having an average degree of polymerization of about 8000 and composed of 99.5% by moles of dimethylsiloxane units and 0.5% by moles of methylvinylsiloxane units with dimethyl vinyl siloxy groups terminating the molecular chain ends, 50 parts of a precipitated silica filler having a specific surface area of 230 m$^2$/g, 10 parts of zinc oxide, 1 part of stearic acid, 5 parts of an $\alpha,\omega$-dihydroxy dimethyl polysiloxane having a viscosity of 20 centistokes, 15 parts of a process oil (Sunpar 2280, a product by Nippon Petroleum Co.), 2 parts of an organosilicon compound expressed by the formula $(CH_3O)_3SiC_3H_6S_4CS-N(CH_3)_2$, 3 parts of 2-mercaptobenzimidazole and 20 parts of a poly(methyl silsesquioxane) powder of spherical particles having an average particle diameter of 2.0 $\mu$m (X-52-590A-1, a product by Shin-Etsu Chemical Co.), of which the sphericity factor was about 1.1 for substantially all of the particles.

This rubber composition was kneaded on a two-roller mill with addition of 1.6% by weight of dicumyl peroxide as a curing agent was shaped and vulcanized under compression for 10 minutes at 170° C. followed by a heat treatment at 150° C. for 2 hours to give a rubber sheet of 2 mm thickness and a test piece for the measurement of permanent compression set having a thickness of 12.6 mm.

For comparison, another rubber compound was prepared with the same formulation as above excepting omission of the poly(methyl silsesquioxane) powder and was vulcanized to give the test specimens under the same conditions as above.

These test pieces were subjected to the measurement of the mechanical properties and surface lubricity either as vulcanized or after a thermal aging treatment at 180° C. for 72 hours to give the results shown in Table 1 below which also shows the extrusion moldability of these rubber compounds.

TABLE 1

| | | Example 1 | Comparative Example 1 |
|---|---|---|---|
| Extrusion moldability | Velocity of extrusion, cm/min. | 190 | 124 |
| | Rate of extrusion, g/min. | 59 | 52 |
| | Die swelling, % | 35 | 93 |
| | Surface texture | Excellent | Good |
| Physical properties, as cured | Hardness, JIS | 67 | 60 |
| | Ultimate elongation, % | 540 | 630 |
| | Tensile strength, kg/cm$^2$ | 112 | 128 |
| | Tear strength, JIS A, kg/cm | 29 | 34 |
| | Permanent compression set, %, after 22 hours at 150° C. | 24 | 27 |
| Increment by thermal aging | Hardness, JIS, point | +4 | +4 |
| | Ultimate elongation, % | −29 | −26 |
| | Tensile strength, % | −3 | −13 |
| Surface lubricity, g | | 85 | 225 |

EXAMPLE 2

A rubber composition was prepared by uniformly kneading, in a pressurizable kneader, 100 parts of a mixture composed of 70% by weight of an EPDM rubber (Esprene 567, supra) and 30% by weight of the same organopolysiloxane as used in Example 1, 55 parts of a precipitated silica filler having a specific surface area of 230 m$^2$/g, 13 parts of zinc oxide, 2.5 parts of stearic acid, 5 parts of the same $\alpha,\omega$-dihydroxy dimethylpolysiloxane as used in Example 1, 36 parts of a process oil (KP-380, a product by Idemitsu Kosan Co.), 15 parts of another process oil (Lucant HC-40, a product by Mitsui Petrochemical Co.) and 1.0 part of an aging retarder (Irganox, a product by Ciba Geigy Co.).

This rubber composition was further admixed with 17.5% by weight of a poly(methyl silsesquioxane) powder of spherical particles having an average particle diameter of 1.5 $\mu$m (X-52-590A-2, a product by Shin-Etsu Chemical Co.), of which the sphericity factor was about 1.1 for substantially all of the particles, 4.5% by weight of azodicarbonamide as a blowing agent and 1.4% by weight of dicumyl peroxide as a curing agent and kneaded on a two-roller mill. A metal mold having a cavity of 100 mm by 100 mm by 6 mm was filled with the thus prepared rubber composition which was precured by heating at 170° C. for 5 minutes under a pressure of 20 kgf/cm$^2$ and then subjected to an expanding cure treatment by heating for 10 minutes in an oven kept at 180° C. to give a foamed spongy rubber body having dimensions of 180 mm by 180 mm by 11 mm. The skin layers of this spongy rubber body were removed by slicing to give a test specimen of 50 mm by 50 mm by 6 mm dimensions which had a bulk density of 0.18 g/cm$^3$ with good feeling to the touch and excellent slipperiness on the human skin. This spongy rubber body was found to be quite satisfactory as puffs for makeup.

EXAMPLES 3 AND 4 AND COMPARATIVE EXAMPLE 2

The formulation in each of these Examples and Comparative Example was the same as in Example 2 described above except that the amount of the poly(methyl silsesquioxane) powder was 5 parts and 30 parts in Examples 3 and 4, respectively, and the powder was omitted in Comparative Example 2. The bulk density, feeling of touch and slipperiness of the thus obtained spongy foamed rubber bodies were as shown in Table 2 below.

TABLE 2

|  | Example 3 | Example 4 | Comparative Example 2 |
| --- | --- | --- | --- |
| Bulk density, g/cm³ | 0.18 | 0.17 | 0.23 |
| Feeling of touch | Excellent | Excellent | Fair |
| Slipperiness | Good | Excellent | Poor |

EXAMPLES 5 to 7

The formulation in each of these Examples was the same as in Example 2 except that the poly(methyl silsesquioxane) powder was replaced with the same amount of a powder of spherical particles having an average particle diameter of 1 μm and prepared from orthomethyl silicate, a powder of spherical particles having an average particle diameter of 0.8 μm and prepared from a 50:50 by weight mixture of orthomethyl silicate and methyl trimethoxy silane or a powder of spherical particles which was a synthetic spherical silica powder having an average particle diameter of 8 μm (E-8, a product by Tokuyama Soda Co.) after a surface treatment with hexamethyl disilazane in Examples 5, 6 and 7, respectively. The thus obtained spongy foamed rubber bodies had a bulk density, feeling of touch and slipperiness as shown in Table 3 below.

TABLE 3

| Example No. | 5 | 6 | 7 |
| --- | --- | --- | --- |
| Bulk density, g/cm³ | 0.18 | 0.18 | 0.17 |
| Feeling of touch | Good | Good | Good |
| Slipperiness | Good | Good | Excellent |

What is claimed is:

1. A vulcanizable rubber composition which comprises, in admixture:
   (a) 100 parts by weight of a curable rubber blend composed of
      (a-1) from 50 to 97% by weight of an ethylene-propylene copolymer, and
      (a-2) from 50 to 3% by weight of an organopolysiloxane having an average degree of polymerization of at least 100 and represented by the average unit formula $R_nSiO_{(4-n)/2}$, in which R is a substituted or unsubstituted monovalent hydrocarbon group and the subscript n is a positive number in the range from 1.90 to 2.05, at least two of the groups denoted by R in a molecule being aliphatically unsaturated groups;
   (b) from 5 to 200 parts by weight of a reinforcing silica filler having a specific surface area of at least 50 m²/g;
   (c) from 5 to 100 parts by weight of a powder composed of spherical particles having a particle diameter in the range from 0.1 μm to 50 μm;
   (d) up to 100 parts by weight of a process oil; and
   (e) from 1 to 20 parts by weight of a curing agent for (a).

2. The rubber composition as claimed in claim 1 wherein at least 50% by moles of the groups denoted by R in the organopolysiloxane are methyl groups.

3. The rubber composition as claimed in claim 1 wherein the particles of the powder as the component (c) have a sphericity factor not exceeding 2, as determined by dividing the largest diameter of the particles by the shortest.

4. The rubber composition as claimed in claim 1 wherein the powder composed of spherical particles is a powder of poly(methyl silsesquioxane).

5. The rubber composition as claimed in claim 1 wherein the amount of the process oil is in the range from 10 to 50 parts by weight per 100 parts by weight of the component (a).

6. The rubber composition as claimed in claim 1 wherein the curing agent is selected from the group consisting of sulfur, organic sulfur compounds and organic peroxides.

7. A cured rubber article which is a vulcanizate of a rubber composition according to claim 1.

8. A foamable vulcanizable rubber composition which comprises, in admixture:
   (a) 100 parts by weight of a curable rubber blend composed of
      (a-1) from 50 to 97% by weight of an ethylene-propylene copolymer, and
      (a-2) from 50 to 3% by weight of an organopolysiloxane having an average degree of polymerization of at least 100 and represented by the average unit formula $R_nSiO_{(4-n)/2}$, in which R is a substituted or unsubstituted monovalent hydrocarbon group and the subscript n is a positive number in the range from 1.90 to 2.05, at least two of the groups denoted by R in a molecule being aliphatically unsaturated groups;
   (b) from 5 to 200 parts by weight of a reinforcing silica filler having a specific surface area of at least 50 m²/g;
   (c) from 5 to 100 parts by weight of a powder composed of spherical particles having a particle diameter in the range from 0.1 μm to 50 μm;
   (d) from 5 to 100 parts by weight of a process oil;
   (e) from 1 to 20 parts by weight of a curing agent; for (a) and
   (f) from 1 to 20 parts by weight of a blowing agent.

9. The foamable rubber composition as claimed in claim 8 wherein the blowing agent is azodicarbonamide or p,p'-hydroxy bis(benzene sulfonyl hydrazide).

10. The foamable rubber composition as claimed in claim 8 wherein the curing agent is an organic peroxide.

11. A spongy rubber article which is an expanded vulcanizate of the foamable rubber composition according to claim 8.

12. The rubber composition as claimed in claim 1, wherein component (a-1) is an EPM or EPDM copolymer.

13. The rubber composition as claimed in claim 6, wherein the curing agent is an organic peroxide.

14. The rubber composition as claimed in claim 6, wherein the particles of component (c) have a particle diameter in the range of 0.2 to 10 μm.

15. The rubber composition as claimed in claim 6, wherein component (c) is a poly(methylsilsesquioxane) powder.

* * * * *